Nov. 15, 1949
C. L. MERSHON
2,488,422
REGULATING SYSTEM
Filed Dec. 30, 1947
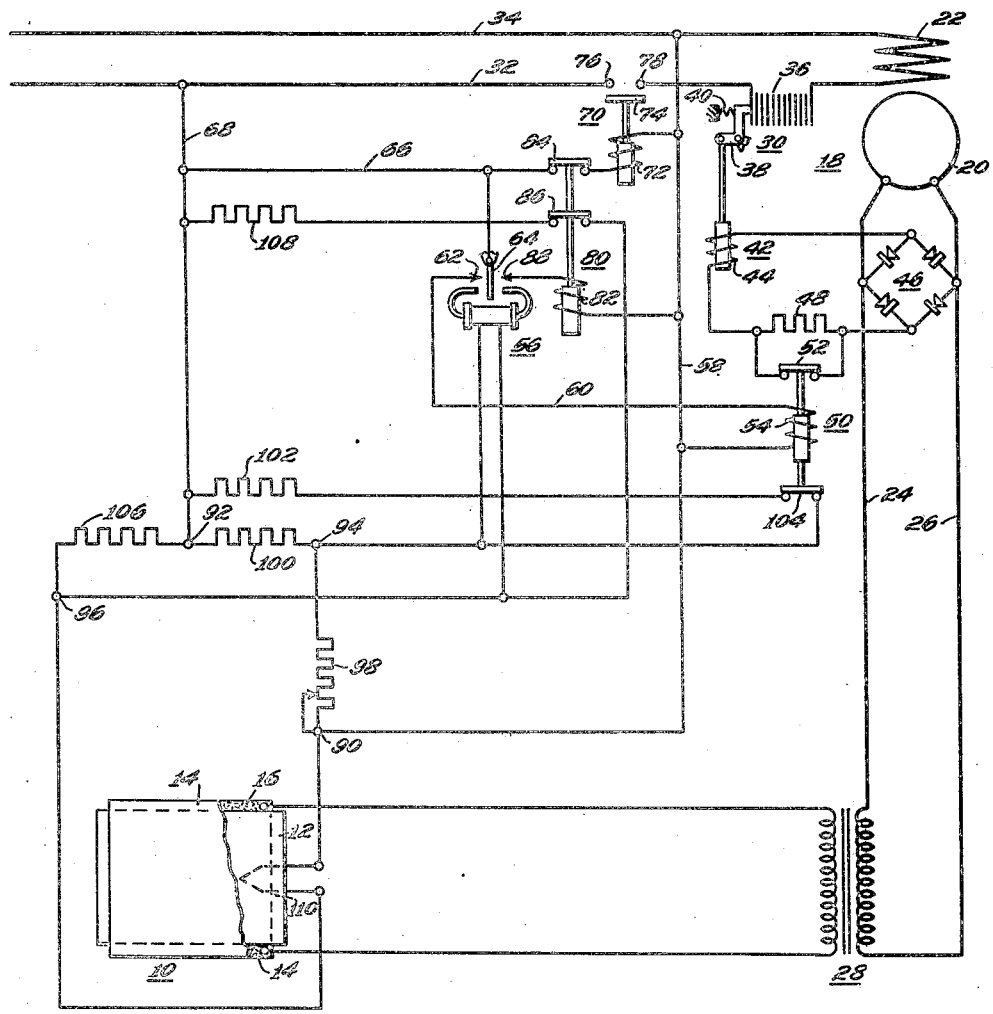
WITNESSES:
INVENTOR
Clarence L. Mershon.
BY
ATTORNEY Patented Nov. 15, 1949

2,488,422

UNITED STATES PATENT OFFICE 2,488,422

REGULATING SYSTEM

Clarence L. Mershon, Lima, Ohio, assignor to Westinghouse Electric Corporation, East Pittsburgh, Pa., a corporation of Pennsylvania Application December 30, 1947, Serial No. 794,527

7 Claims. (Cl. 219—20)

This invention relates to regulating systems and in particular to systems for regulating the temperature of windows of aircraft.

An object of this invention is to provide, in a regulating system for maintaining the temperature of a window, for a positive regulating operation upon a change in the temperature to insure a corrective operation without accompanying chatter of control contact members.

Another object of this invention is to provide, in a regulating system having a resistance bridge circuit sensitive to changes in temperature, for effecting a positive change in the balance of the bridge circuit under predetermined operating conditions to insure a positive regulating action.

Other objects of this invention will become apparent from the following description when taken in conjunction with the accompanying drawing the single figure of which is a diagrammatic view of apparatus and system involving the teachings of this invention.

Referring to the drawing this invention is illustrated by reference to a system for controlling the temperature of a windowpane 10. The windowpane 10 in this instance is formed of a layer of plastic 12 sandwiched between two layers of glass 14, one layer of glass having a coating 16 formed of a conductive material which will function as a resistor element therebetween. Such a windowpane 10 is more fully described in Technical Glass Bulletin No. 15 of the Pittsburgh Plate Glass Company of Pittsburgh, Pennsylvania. The composition of the layers 12, 14 and 16 may be of many different materials so long as the combination acts as a transparent windowpane and the conductive layer 16 functions as a resistor element.

In order to supply current to the layer 16 of conductive material to effectively heat the windowpane 10, a generator 18 is provided, the generator being disposed to be driven by a suitable prime mover (not shown) and being formed of armature windings 20 and field windings 22. The armature windings 20 are connected by conductors 24 and 26 to the primary windings of a transformer 28, the secondary windings of which are connected to terminals formed on the intermediate layer 16 of conductive material. As illustrated the field windings 22 are connected through a pile resistor 30 and by conductors 32 and 34 to a suitable source of direct current supply represented by the positive and negative symbols.

In this instance, the pile resistor 30 is of the usual construction having a pile 36 formed of a plurality of discs of high resistance material such as carbon or the like and being disposed to be compressed by means of the crank lever 38 which is normally biased to apply pressure thereto by a spring 40 and disposed to be moved to release the pressure by an electromagnet 42. The electromagnet 42 is provided with a winding 44 which is disposed to be connected across the output terminals of a full-wave rectifier 46, the input terminals of which are connected across the conductors 24 and 26 whereby the winding 44 is normally supplied in accordance with the output of the generator 18.

In order to control the degree of energization of the regulator electromagnet 42 under predetermined operating conditions, a resistor 48 is connected in circuit relation with the energizing winding 44. As illustrated a contactor 50 having a contact member 52 is disposed to normally shunt the resistor 48 and, when energized is operated to effect the connection of resistor 48 in series circuit with the winding 44. The contactor 50 is provided with a winding 54 which is disposed to be energized depending upon the directional energization of a polarized relay 56. Thus one terminal of the winding 54 is connected by conductor 58 to supply conductor 34, the other terminal being disposed to be connected through conductor 60, fixed contact member 62, the armature contact member 64 of the polarized relay 56, and conductors 66 and 68 to the other supply conductor 32.

As illustrated, in order to control the direct current supply to the field windings 22 of the generator 18, a contactor 70 having an energizing winding 72 and a contact member 74 is disposed for operation, when energized, to a circuit closing position where the contact member 74 normally bridges fixed contact members 76 and 78. In order to control the energization of contactor 70, another contactor 80 having an energizing winding 82 and two contact members 84 and 86 is provided being so disposed that in the normally deenergized position the contact member 84 establishes the energizing circuit for winding 72, which circuit extends from the supply conductor 34 through conductor 58, energizing winding 72, contact member 84 and conductors 66 and 68 to the other supply conductor 32.

The general control system just described for shunting at least a part of the resistor 48 and for normally energizing the contactor 70 to establish the energizing circuit for the field winding 22 is disclosed and claimed in my copending application Serial No. 750,904, now Patent No. 2,462,-

207, issued Feb. 22, 1949, filed May 28, 1947, for Temperature regulating systems.

The operation of the contactor 80 is dependent upon the directional operation of the polarized relay 56. Thus when the polarized relay 56 is energized, as will be explained more fully hereinafter, to actuate the armature contact member 64 into engagement with an associated fixed contact member 88, a circuit is established extending from supply conductor 34 through conductor 58, energizing winding 82, contact member 88, armature contact arm member 64 and conductors 66 and 68 to the other supply conductor 32 to energize the winding 82 and effect operation of the contactor 80.

As illustrated, the polarized relay 56 is disposed to be directly energized in accordance with the unbalanced condition of a resistance bridge circuit formed of four resistor legs. In this instance, the bridge circuit is provided with intermediate input terminals 90 and 92 connected by conductors 58 and 68, respectively, to supply conductors 34 and 32, respectively, and intermediate taps 94 and 96, respectively, to which the energizing winding of the polarized relay 56 is connected. Thus one leg of the resistance bridge circuit is formed of adjustable resistor 98 connected between taps 90 and 94, the cooperating leg in the input circuit being normally formed of two resistors 100 and 102 which are normally connected in parallel circuit relation by an auxiliary contact member 104 carried by the contactor 50. A third leg section of the bridge is also formed of a pair of resistors 106 and 108 which are normally connected in parallel circuit relation with one another by the contact member 86 of the contactor 80, whereas the fourth leg or section is formed of a resistor 110.

In this embodiment, the resistor 110 is formed of any material having a high temperature coefficient of resistance, such as nickel wire, the resistor 110 being represented as being closely adjacent to the windowpane 10 and, where possible, embedded in the plastic layer 12 of the window so that the resistance of the resistor 110 will vary directly as the temperature of the windowpane 10 varies from a predetermined temperature which is to be maintained. On the other hand, the resistors 98, 100, 102, 106 and 108 are preferably formed of material having a low temperature coefficient of resistance, such as Advance.

In operation, assuming that the layer 16 of the windowpane 10 is connected to be supplied from the generator 18 and that the resistance bridge circuit has been properly balanced, as by adjusting the resistor 98, to maintain a predetermined temperature within the window 10, the system is as shown with the polarized relay 56 deenergized and the armature contact member 64 thereof in a mid-position but with the contactor 70 energized whereby the contact member 74 thereof bridges contact members 76 and 78 and the field winding 22 of the generator 18 is energized.

Under such conditions, assume that the temperature of the windowpane 10 decreases from the predetermined temperature which it is desired to maintain, then the resistance of resistor 110 decreases in accordance with the temperature decrease with the result that the polarity of the mid-terminal 96 of the resistance bridge circuit becomes more positive with respect to the polarity of the mid-terminal 94 and current flows from the mid-terminal 96 through the energizing winding of the polarized relay 56 to the mid-terminal 94. When the winding of the polarized relay 56 is energized in this manner, the armature contact member 64 tends to and is moved to the left to engage the fixed contact member 62 and establish the energizing circuit for contactor 50.

Thus if the change in temperature is a slight change so that the armature contact member 64 tends to vibrate into and out of engagement with the fixed contact member 62 with accompanying chatter and wear on the contact members, the contactor 50 is energized and its contact members 104 and 52 are actuated to open circuit positions. As the contact member 104 is actuated to open circuit position it interrupts the parallel circuit connection of resistors 100 and 102 forming the one leg of the bridge with the result that only resistor 100 is connected in the bridge circuit to effect a positive unbalance of the bridge circuit whereby a positive directional operation of the relay 56 is obtained to effect the engagement of armature contact member 64 and the fixed contact member 62.

As the contactor 50 is thus energized, the contact member 52 is moved to the open circuit position to remove the shunt from about resistor 48 and effectively connect the resistor 48 in series circuit relation with the energizing winding 44 of the electromagnet 42 to decrease the energization thereof. Under such conditions, the spring member 40 functions to apply more pressure to the pile 36 of the rheostat 30 and thereby decrease the resistance of the rheostat 30 to increase the flow of current through the field winding 22 of the generator 18. As the excitation of the generator 18 is thus increased, the flow of current therefrom to the conductive layer 16 of the windowpane 10 is increased to thereby effect an increase in the temperature of the windowpane 10 to the predetermined temperature which is to be maintained.

On the other hand, if the temperature variation of the windowpane 10 is an increase in temperature, then the resistance of the resistor element 110 increases in accordance with the increase in temperature, whereby the polarity of the mid-terminal 94 becomes more positive with respect to the polarity of the mid-terminal 96 and current flows through the winding of the polarized relay in a direction to actuate the armature contact member 64 of the relay 56 to the right to engage the fixed contact member 88. The engagement of contact members 64 and 68 establishes the energizing circuit for the winding 82 of contactor 80 whereby contact members 84 and 86 are actuated to their open circuit position.

When the contact member 86 is in the open circuit position it interrupts the parallel connection of resistors 106 and 108 whereby only resistor 106 is effective in the bridge circuit thereby effecting a positive unbalance in the resistance bridge to provide a positive directional operation of the relay 56 to maintain the armature contact member 64 and contact member 88 in engagement to eliminate chatter. At the same time, the movement of the contact member 84 of contactor 80 interrupts the energizing circuit for the winding 72 of contactor 70 with the result that the contact member 74 thereof drops to an open circuit position to thereby interrupt the circuit to the field windings 22 of the generator 18. The interruption of the field winding circuit of course effectively stops the flow of current from the generator 18 to the conducting coating 16 of the windowpane 10, whereby the temperature of the windowpane decreases towards the predetermined temperature which is to be maintained.

During a corrective operation, it will of course be understood that, as the temperature of the windowpane 10 is returned to the temperature which is to be maintained the polarized relay 56 becomes deenergized with the result that contactor 50 or 80, as the case may be, is deenergized to again connect resistors 100 and 102 or 106 and 108, respectively, in parallel circuit relation. Preferably, the resistors 102 and 108 are small as compared with their cooperating resistors 100 and 106, respectively, so that the parallel connection established as the temperature of the windowpane 10 is returned to the predetermined temperature will not effect too great an unbalance to effect an operation of the relay 56 in the opposite direction and the overrun in heating effect will be sufficient to again effect a balance of the bridge circuit.

The system is sensitive to temperature changes and provides a positive selective operation to maintain a predetermined temperature of the window. It is composed of standard components and can be readily duplicated.

I claim as my invention:

1. In a system for regulating the temperature of a window having a resistor heating element associated therewith, in combination, a generator connected to be operated to deliver current to the resistor heating element, a field winding for the generator, control means in circuit relation with the field winding disposed to be selectively operated to control the excitation of the generator, an adjustable bridge circuit having four resistance legs, one of the resistance legs being disposed in juxtaposition to the window, two of the legs having adjustable resistance, a polarized relay connected across the bridge circuit disposed for directional operation in response to unbalance of the bridge circuit to effect the selective operation of the control means, and means responsive to the initial operation of the polarized relay disposed for selective operation depending upon the directional operation of the polarized relay for selectively adjusting the resistance of one of the adjustable resistance legs to effect a positive unbalance of the bridge circuit to insure a positive directional operation of the polarized relay.

2. In a system for regulating the temperature of a window having a resistor heating element associated therewith, in combination, a generator connected to be operated to deliver current to the resistor heating element, a field winding for the generator, a pair of contactors disposed to be selectively energized to control the field excitation of the generator, an adjustable bridge circuit having four resistance legs, one of the resistance legs being disposed in juxtaposition to the window, two of the legs having adjustable resistance, a polarized relay connected across the bridge circuit disposed for directional operation in response to unbalance of the bridge circuit to effect the selective energization of the pair of contactors, and means responsive to the initial operation of the polarized relay disposed for selective operation to selectively adjust the resistance of one of the adjustable resistance legs of the resistance bridge to effect a positive unbalance of the bridge circuit to insure a positive directional operation of the polarized relay.

3. In a system for regulating the temperature of a window having a resistor heating element associated therewith, in combination, a generator connected to be operated to deliver current to the resistor heating element, a field winding for the generator, a rheostat connected in circuit relation with the field winding and disposed for operation to control the excitation of the generator, a winding having a resistor connected in circuit relation therewith disposed to be energized in accordance with the operation of the generator to control the operation of the rheostat, a resistance bridge circuit having four resistance legs, one of the resistance legs being disposed in juxtaposition to the window, two of the legs being formed of a plurality of resistors connected in circuit relation, a polarized relay connected across the bridge circuit disposed for directional operation to control the connection of the resistor in circuit with the energizing winding, and means responsive to the initial operation of the polarized relay disposed for selective operation depending upon the directional operation of the polarized relay for selectively changing the connections of the resistors forming one of said two legs to effect a positive change in the balance of the resistance bridge to insure a positive operation of the polarized relay.

4. In a system for regulating the temperature of a window having a resistor heating element associated therewith, in combination, a generator connected to be operated to deliver current to the resistor heating element, a field winding for the generator, a rheostat connected in circuit relation with the field winding and disposed for operation to control the excitation of the generator, a winding having a resistor connected in circuit relation therewith disposed to be energized in accordance with the operation of the generator to control the operation of the rheostat, a contactor disposed for operation to interrupt the field energizing circuit, an adjustable resistance bridge circuit having four resistance legs, one of the resistance legs being disposed in juxtaposition to the window, two of the legs having adjustable resistance, a polarized relay connected across the bridge circuit disposed for directional operation in response to unbalance of the bridge circuit to selectively control the operation of the contactor and the connection of the resistor in circuit with the energizing winding, and means responsive to the initial directional operation of the polarized relay disposed for selective operation to selectively adjust the resistance of one of the adjustable resistance legs of the bridge circuit to effect a positive unbalance thereof to insure a positive directional operation of the polarized relay.

5. In a system for regulating the temperature of a window having a resistor heating element associated therewith, in combination, a generator connected to be operated to deliver current to the resistor heating element, a field winding for the generator, control means in circuit relation with the field winding disposed to be selectively operated to control the excitation of the generator, an adjustable bridge circuit having four resistance legs, one of the resistance legs being disposed in juxtaposition to the window, two of the legs having adjustable resistance, a polarized relay connected across the bridge circuit disposed for directional operation in response to unbalance of the bridge circuit to effect the selective operation of the control means, and a pair of contactors selectively responsive to the initial directional operation of the polarized relay disposed for operation to selectively adjust the resistance of one of the adjustable resistance legs to effect a selective positive unbalance of the bridge circuit to insure a positive directional operation of the polarized relay.

6. In a system for regulating the temperature of a window having a resistor heating element associated therewith, in combination, a generator connected to be operated to deliver current to the resistor heating element, a field winding for the generator, a rheostat connected in circuit relation with the field winding and disposed for operation to control the excitation of the generator, a winding having a resistor connected in circuit relation therewith disposed to be energized in accordance with the operation of the generator to control the operation of the rheostat, a contactor disposed for operation to interrupt the field energizing circuit, an adjustable resistance bridge circuit having four resistance legs, one of the resistance legs being disposed in juxtaposition to the window, two of the legs having adjustable resistance, a polarized relay connected across the bridge circuit disposed for directional operation in response to unbalance of the bridge circuit to selectively control the operation of the contactor and the connection of the resistor in circuit with the energizing winding, and a pair of contactors selectively responsive to the initial directional operation of the polarized relay disposed for operation to selectively adjust the resistance of one of the adjustable resistance legs to effect a selective positive unbalance of the bridge circuit to insure a positive directional operation of the polarized relay.

7. In a system for regulating the temperature of a window having a resistor heating element associated therewith, in combination, a generator connected to be operated to deliver current to the resistor heating element, a field winding for the generator, a rheostat connected in circuit relation with the field winding and disposed for operation to control the excitation of the generator, a winding having a resistor connected in circuit relation therewith disposed to be energized in accordance with the operation of the generator to control the operation of the rheostat, a contactor disposed for operation to interrupt the field energizing circuit, a resistance bridge circuit having four resistance legs, one of the resistance legs being disposed in juxtaposition to the window, two of the legs being formed of a plurality of resistors connected in circuit relation, a polarized relay connected across the bridge circuit disposed for directional operation in response to unbalance of the bridge circuit to selectively control the operation of the contactor and the connection of the resistor in circuit with the energizing winding, and a pair of contactors selectively responsive to the initial directional operation of the polarized relay disposed for operation to effect a selective positive unbalance of the bridge circuit to insure a positive directional operation of the polarized relay.

CLARENCE L. MERSHON.

REFERENCES CITED

The following references are of record in the file of this patent:

UNITED STATES PATENTS

| Number | Name | Date |
| --- | --- | --- |
| 1,260,230 | Mason | Mar. 19, 1918 |
| 1,715,750 | Gano | June 4, 1929 |
| 2,079,497 | Wilhjelm | May 4, 1937 |
| 2,090,692 | Melton | Aug. 24, 1937 |
| 2,170,193 | Godsey, Jr. | Aug. 22, 1939 |
| 2,389,939 | Sparrow | Nov. 27, 1945 |
| 2,427,729 | Jenkins | Sept. 23, 1947 |